(12) United States Patent
Xu et al.

(10) Patent No.: US 12,317,383 B2
(45) Date of Patent: May 27, 2025

(54) LIGHTING APPARATUS

(71) Applicant: LEEDARSON LIGHTING CO., LTD., Fujian (CN)

(72) Inventors: Yangbin Xu, Fujian (CN); Yankun Li, Fujian (CN); Hemu Ye, Fujian (CN); Qiqiang Lin, Fujian (CN); Zongyuan Liu, Fujian (CN); Liangliang Cao, Fujian (CN); Changjing Zeng, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 158 days.

(21) Appl. No.: 18/113,792

(22) Filed: Feb. 24, 2023

(65) Prior Publication Data

US 2023/0284352 A1  Sep. 7, 2023

(30) Foreign Application Priority Data

Mar. 4, 2022  (CN) .......................... 202210209188.5

(51) Int. Cl.
*H05B 45/20* (2020.01)
*H05B 45/10* (2020.01)
*H05B 47/155* (2020.01)

(52) U.S. Cl.
CPC ............. *H05B 45/20* (2020.01); *H05B 45/10* (2020.01); *H05B 47/155* (2020.01)

(58) Field of Classification Search
CPC ....... H05B 45/20; H05B 47/155; H05B 45/10
See application file for complete search history.

(56) References Cited

U.S. PATENT DOCUMENTS

| | | | |
|---|---|---|---|
| 10,595,371 B2 * | 3/2020 | Zeng | F21S 4/22 |
| 10,731,799 B2 * | 8/2020 | Dendorfer | F21V 23/005 |
| 11,029,009 B2 * | 6/2021 | Zeng | F21V 23/005 |
| 11,106,120 B2 * | 8/2021 | Chou | G03B 21/2033 |
| 2020/0413514 A1 * | 12/2020 | Qiu | H05B 45/10 |

FOREIGN PATENT DOCUMENTS

| | | | | |
|---|---|---|---|---|
| CN | 106409241 A | * | 2/2017 | ............. G09G 3/342 |
| KR | 101247506 B1 | * | 2/2013 | |
| WO | WO-2008041153 A1 | * | 4/2008 | ......... H05B 33/0815 |

* cited by examiner

*Primary Examiner* — Lincoln D Donovan
*Assistant Examiner* — James G Yeaman
(74) *Attorney, Agent, or Firm* — Chun-Ming Shih; LANWAY IPR SERVICES

(57) ABSTRACT

A lighting apparatus includes a first light source, a second light source, a third light source, a driver, a first controller, a second controller and a main controller. The first light source emits a first light with a first color temperature. The second light source emits a second light with a second color temperature. The third light source emits a third light with a third color temperature. The driver generates a first driving current to the first light source, generates a second driving current to the second light source, and generates a third driving current to the third light source.

19 Claims, 17 Drawing Sheets

LIGHTING APPARATUS

FIELD

The present invention is related to a lighting apparatus, and more particularly related to a lighting apparatus with flexible control.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

There is strong request to render light with a more flexible control. In addition, it is beneficial if the light adjustment may approach natural characteristic, e.g. dim to warm feature.

SUMMARY

In some embodiments, a lighting apparatus includes a first light source, a second light source, a third light source, a driver, a first controller, a second controller and a main controller.

The first light source emits a first light with a first color temperature.

The second light source emits a second light with a second color temperature.

The third light source emits a third light with a third color temperature.

The driver generates a first driving current to the first light source, generates a second driving current to the second light source, and generates a third driving current to the third light source.

The first controller is coupled to the driver for changing a ratio between the first driving current and the second driving current to obtain a first mixed light.

The first mixed light has a first mixed color temperature.

The second controller is coupled to the driver for changing the third driving current so as to mix the first mixed light with the third light to produce a total mixed light.

The main controller is coupled to the first controller and the second controller.

When a light intensity of the total mixed light decreases, a color temperature is decreased under a first working mode.

In some embodiments, the lighting apparatus may also include a dimmer switch for sending a dimmer operation to the main controller to lower the light intensity of the total mixed light under the first working mode.

In some embodiments, a voltage drop parameter of the third light source is lower than both the first light source and the second light source.

In some embodiments, when a driving voltage of the driver is increased, a light intensity of the third light source is decreased.

In some embodiments, the driving voltage is larger than a threshold, the third lights source is turned off.

In some embodiments, the first light source, the second light source and the third light source are LED modules.

In some embodiments, the third color temperature of the third light source is lower than both the first light source and the second light source.

In some embodiments, the lighting apparatus may also include a manual switch coupled to the first controller for adjusting the ratio between the first driving current and the second driving current.

In some embodiments, the manual switch has more than three options to be selected manually.

Each option is associated to a different value of the first mixed color temperature.

In some embodiments, the first light source and the second light source are connected as a light module.

The light module is connected with the third light source in parallel.

In some embodiments, the lighting apparatus may also include a mode switch to select from the first working mode and a second working mode.

In the second working mode, the third light source is disabled.

In some embodiments, the driver includes a rectifier for converting an external AC power to a DC power.

The driver includes a filter for filtering the DC power to the first driving current, the second driving current and the third driving current.

In some embodiments, the lighting apparatus may also include a downlight housing for holding the first light source, the second light source, the third light source and the driver.

In some embodiments, the lighting apparatus may also include a light bulb housing for holding the first light source, the second light source, the third light source and the driver.

In some embodiments, the lighting apparatus may also include a single light source plate for disposing the first light source, the second light source, the third light source and the driver.

In some embodiments, the main controller references a table for rendering the total mixed light to approach to a black-body radiation curve.

In some embodiments, the total mixed light has a color temperature falling within 30% difference of the black-body radiation curve.

In some embodiments, the main controller issues control signals to a constant current source to generate the first driving current, the second driving current and the third driving current.

In some embodiments, the main controller receives a wireless command to adjust the first driving current, the second driving current and the third driving current.

In some embodiments, in a third working mode, the first light source and the second light source are disabled and only the third light source emits the third light.

DETAILED DESCRIPTION

Figure 17:
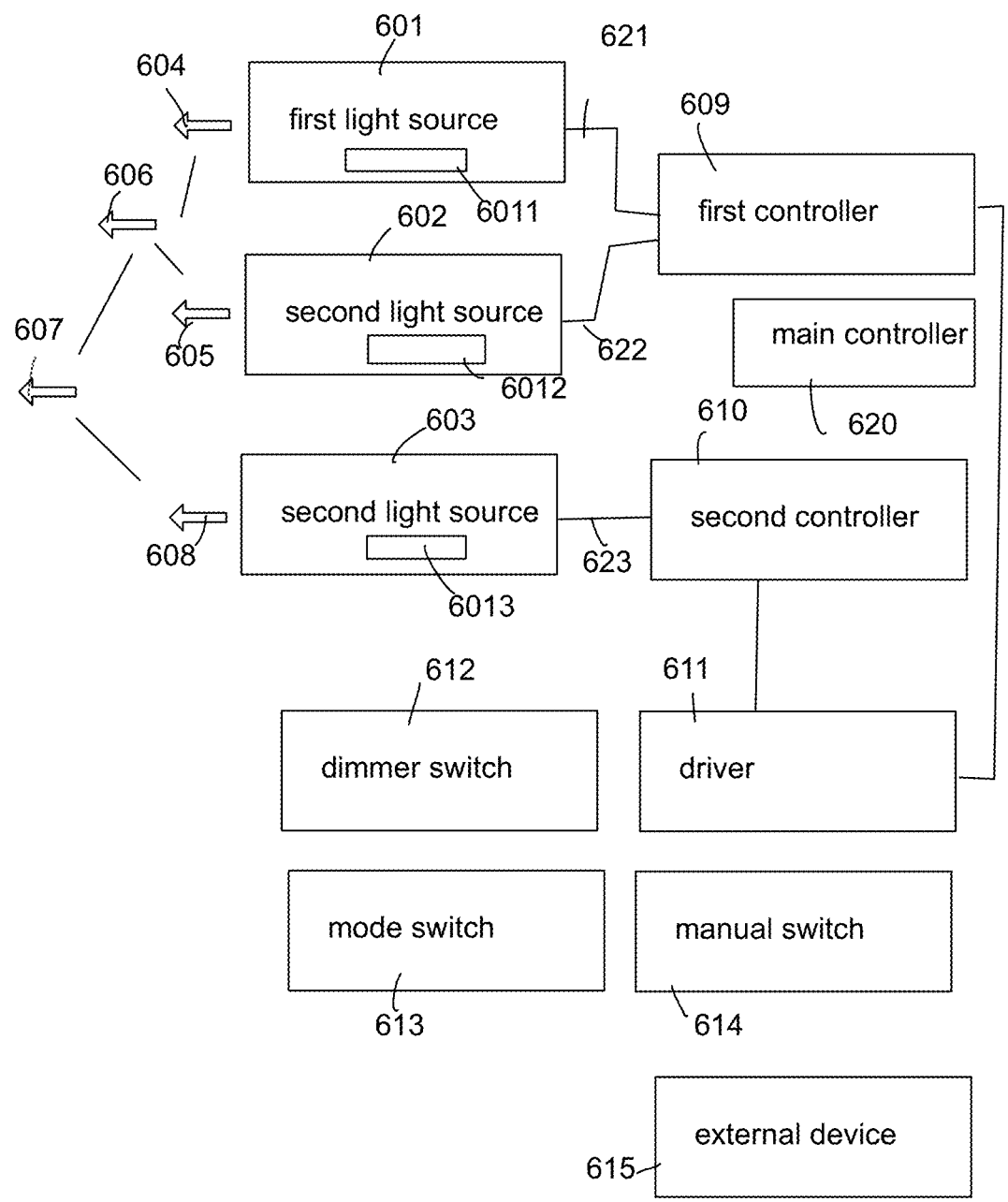
FIG. 17 shows a lighting apparatus embodiment.

In FIG. 17, a lighting apparatus includes a first light source 601, a second light source 602, a third light source 603, a driver 611, a first controller 609, a second controller 610 and a main controller 620.

The first light source 601 emits a first light 604 with a first color temperature.

The second light source 602 emits a second light 605 with a second color temperature.

The third light source 603 emits a third light 608 with a third color temperature.

The driver 611 generates a first driving current 621 to the first light source 601, generates a second driving current 622 to the second light source 602, and generates a third driving current 623 to the third light source 603.

The first controller 609 is coupled to the driver 611 for changing a ratio between the first driving current 621 and the second driving current 622 to obtain a first mixed light 606.

For example, pulse modulation may be applied. In such case, the first controller adjusts a relative ration of duty ratios of the first driving current and the second driving current. In other words, a current is divided over time to supply to the first light source 601 and the second light source 602.

The first mixed light 606 has a first mixed color temperature.

The second controller 610 is coupled to the driver 611 for changing the third driving current 623 so as to mix the first mixed light 606 with the third light 608 to produce a total mixed light 607.

In such design, the total mixed light 607 has two factors. First, the first light and the second light are combined with a desired ratio to obtain a first color temperature. By adjusting the relative light intensity between the first mixed light 606 and the third light, a total mixed light 607 is given with a final result.

By controlling the light intensity ratio between the first light source 601, the second light source 602, and the third light source 603, a smooth light parameter control is obtained with a low cost solution.

The main controller 620 is coupled to the first controller 609 and the second controller 610.

When a light intensity of the total mixed light decreases, a color temperature is decreased under a first working mode.

For example, when the light intensity is larger, the mixed color temperature is higher, which resembles the natural light characteristic. In the sunset, the color temperature is lower and the light intensity is smaller. At noon, the color temperature is higher and the light intensity is larger. Such setting causes nice light effect favored by many users.

In some embodiments, the lighting apparatus may also include a dimmer switch 612 for sending a dimmer operation to the main controller 620 to lower the light intensity of the total mixed light under the first working mode.

For example, a rotation button may be used as a tool for receiving user operation so as to send a signal to the main controller 620 to adjust the total mixed light 607.

In some embodiments, a voltage drop parameter of the third light source 603 is lower than both the first light source 601 and the second light source 602. The voltage drop refers to the supplied voltage and the light output relation. If the voltage drop of the third light source is lower, the third light source may be disconnected from a supplied voltage while the first light source and the second light source is over a threshold. With such characteristic, the third light source 603 may be substantially turned off when the supplied voltage associated to a light intensity operation is increased over a predetermined threshold.

In some embodiments, when a driving voltage of the driver is increased, a light intensity of the third light source 603 is decreased.

In some embodiments, the driving voltage is larger than a threshold, the third light source 603 is turned off.

In some embodiments, the first light source 601, the second light source 602 and the third light source 603 are LED modules 6011, 6012, 6013.

In some embodiments, the third color temperature of the third light source 603 is lower than both the first light source 601 and the second light source 602.

For example, the first color temperature of the first light source 601 is between 3000K-5000K, the second light source 602 has a second color temperature between 2000K-4000K and the third light source has a color temperature between 1000K-2000K.

In some embodiments, the lighting apparatus may also include a manual switch 614 coupled to the first controller 609 for adjusting the ratio between the first driving current 621 and the second driving current 622.

In some embodiments, the manual switch 614 has more than three options to be selected manually. For example, the manual switch 614 may have five options by disposing five different resistors to change voltage signal representing corresponding color temperatures.

Each option is associated to a different value of the first mixed color temperature.

In some embodiments, the first light source 601 and the second light source 602 are connected as a light module, which is the combined unit and thus is not particularly marked in the drawing.

The light module is connected with the third light source 6013 in parallel.

In some embodiments, the lighting apparatus may also include a mode switch 613 to select from the first working mode and a second working mode.

In the second working mode, the third light source 603 is disabled. Such configuration provides users with a more flexible control on the lighting apparatus. For example, people or manufacturers may provide a simple version that does not provide dim-to-warm function in the second working mode.

In some embodiments, the driver 611 includes a rectifier for converting an external AC power to a DC power. In following diagram, the rectifier is illustrated, e.g. the bridge circuit in FIG. 3.

The driver 611 includes a filter for filtering the DC power to the first driving current, the second driving current and the third driving current. The filter may include wave filter or other filters to provide a smooth constant DC driving source.

In some embodiments, the lighting apparatus may also include a downlight housing for holding the first light source, the second light source, the third light source and the driver.

Figure 13:
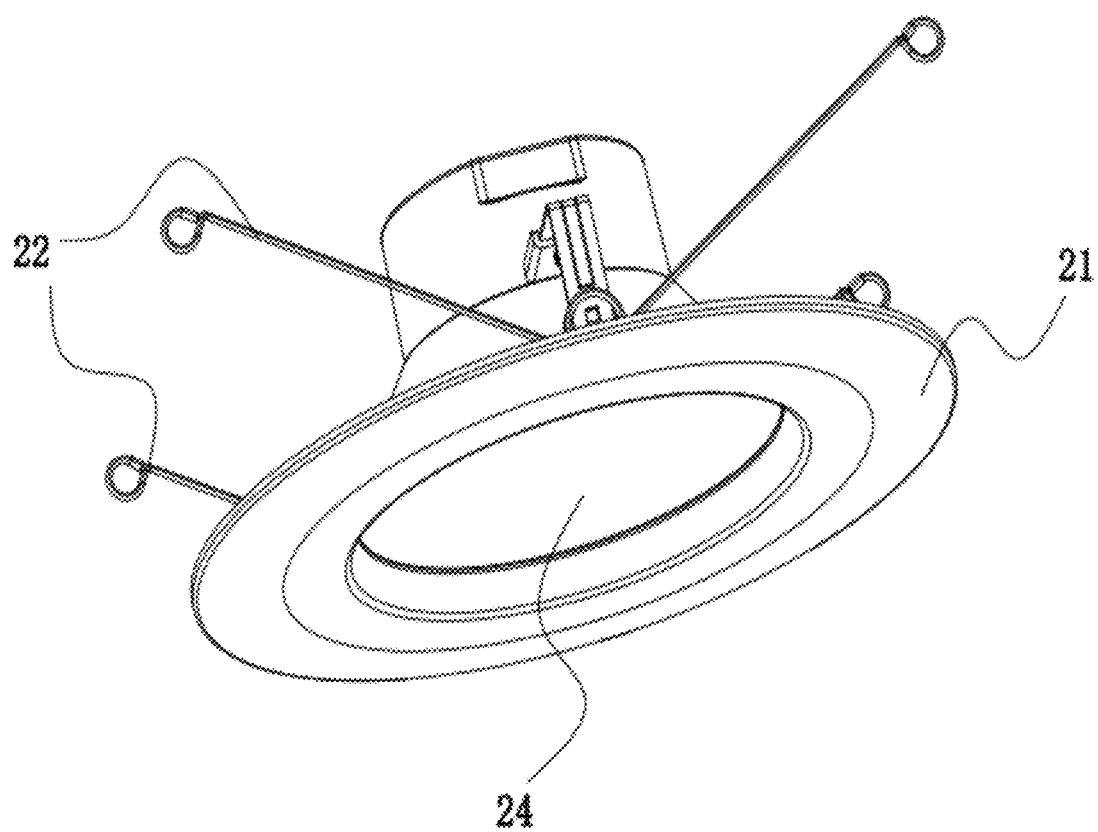
FIG. 13 illustrates a downlight embodiment.

For example, FIG. 13 shows a downlight example. The components mentioned above may be disposed in a downlight apparatus.

In some embodiments, the lighting apparatus may also include a light bulb housing for holding the first light source, the second light source, the third light source and the driver. The light bulb is well known and thus its housing is not particularly illustrated. People skilled in the art would know by reference to FIG. 13 how it is applied to a light bulb device.

In some embodiments, the lighting apparatus may also include a single light source plate for disposing the first light source, the second light source, the third light source and the driver.

Figure 16:
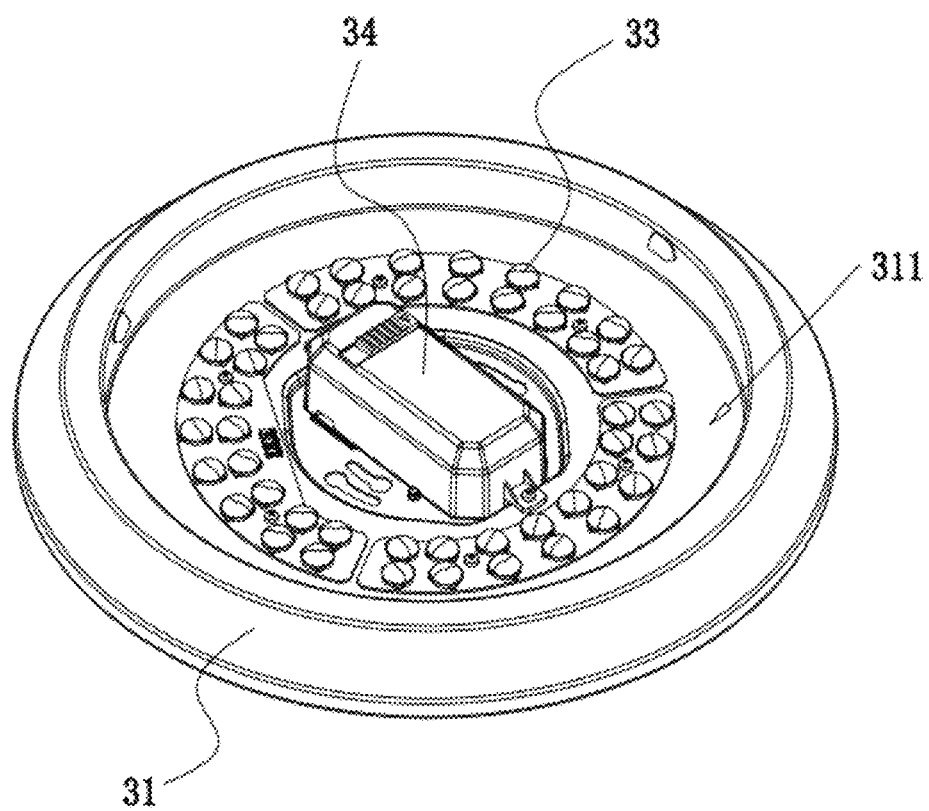
FIG. 16 illustrates an inner structure of the example in FIG. 15.

FIG. 16 shows such an example, the light source and the driver are disposed on a single circuit board. The driver circuits and the controllers may be designed for decreasing their size so that the light source plate with components thereon form a light module.

Such design makes the manufacturing cost and process lower and quicker.

In some embodiments, the main controller references a table for rendering the total mixed light to approach to a black-body radiation curve.

The table may be stored in a memory device and accessible by the main controller.

In some embodiments, the total mixed light has a color temperature falling within 30% difference of the black-body radiation curve.

Figure 12:
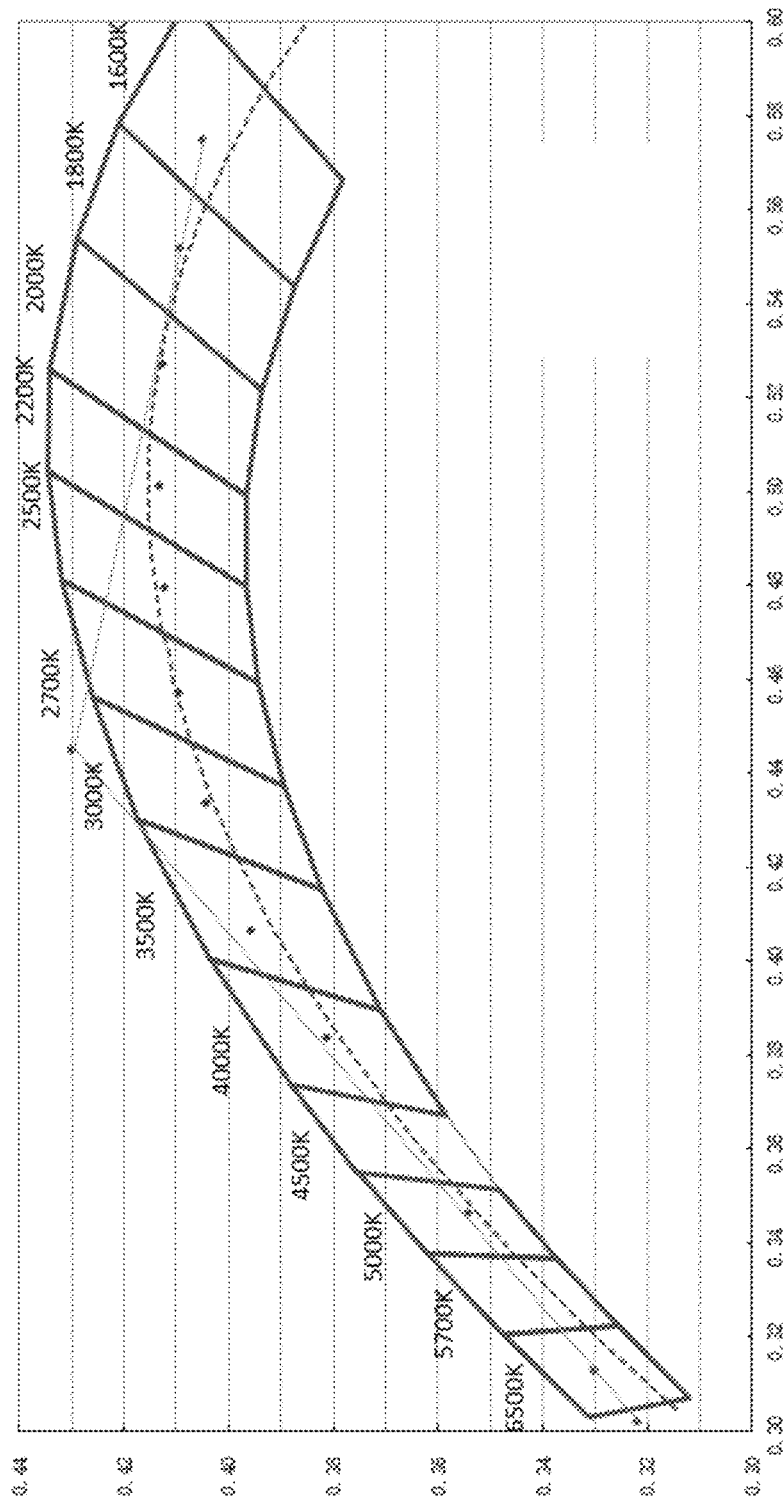
FIG. 12 illustrates a black body radiation diagram.

FIG. 12 shows a black-body radiation curve with 30% difference range and the main controller adjusts the first driving current, the second driving current and the third driving current to obtain desired color temperature as illustrated in the diagram of FIG. 12.

In some embodiments, the main controller issues control signals to a constant current source to generate the first driving current, the second driving current and the third driving current.

In FIG. 17, the main controller receives a wireless command from an external device 615 to adjust the first driving current, the second driving current and the third driving current.

In some embodiments, in a third working mode, the first light source and the second light source are disabled and only the third light source emits the third light.

Figure 1:
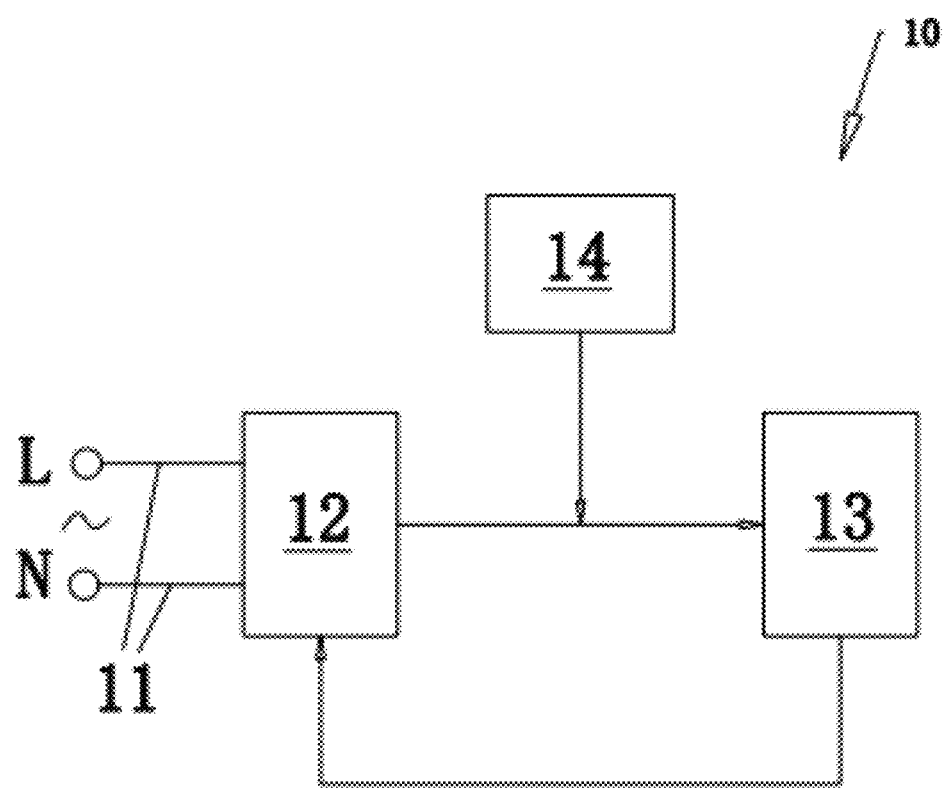
FIG. 1 illustrates a control design of a lighting apparatus embodiment.

Please refer to FIG. 1. The lighting apparatus 10 has a main controller 14, a driver 12 and a light module 13. The main controller 14 may receive an external command from an external device or receive a control signal from a dimmer switch, a mode switch, or a manual switch as mentioned above so that users may instruct how the lighting apparatus to render a mixed light as desired. The driver 12 converts an external AC power 11 to driving currents supplied to the light module 13.

Figure 2:
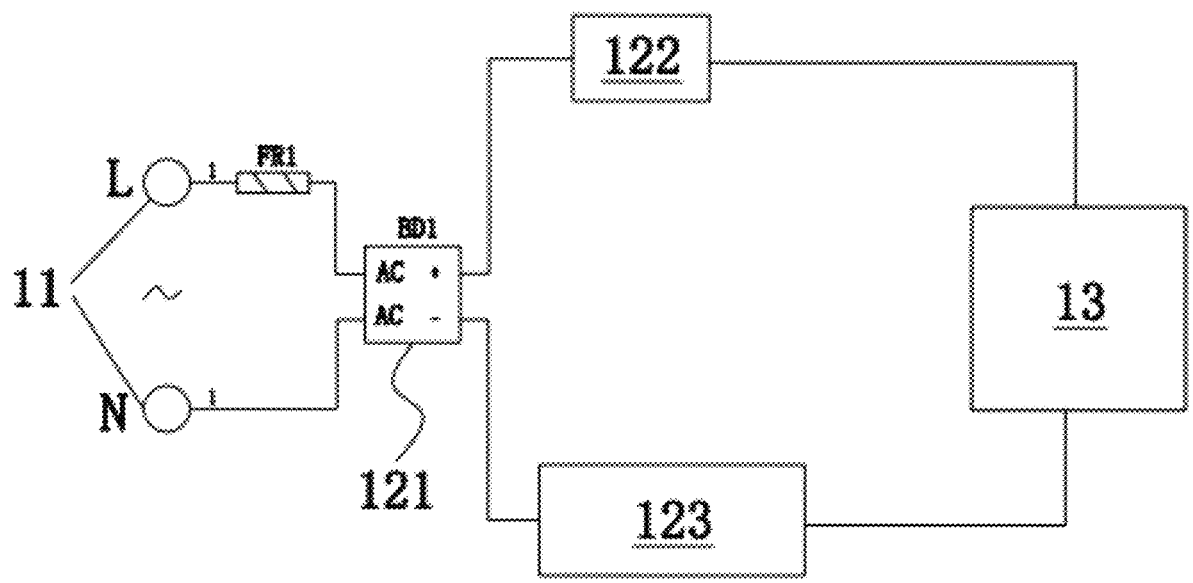
FIG. 2 illustrates a control circuit schema of a lighting apparatus.

FIG. 2 shows a similar embodiment like FIG. 1. In FIG. 2, the AC power 11 is processed by a rectifier 121 that may include a bridge circuit to convert the AC power 11 to a DC power. The DC power is further processed by a filter circuit 122 to provide a stable constant DC power. In addition, the main controller 123 is used for generating control signals to control other components.

Figure 3:
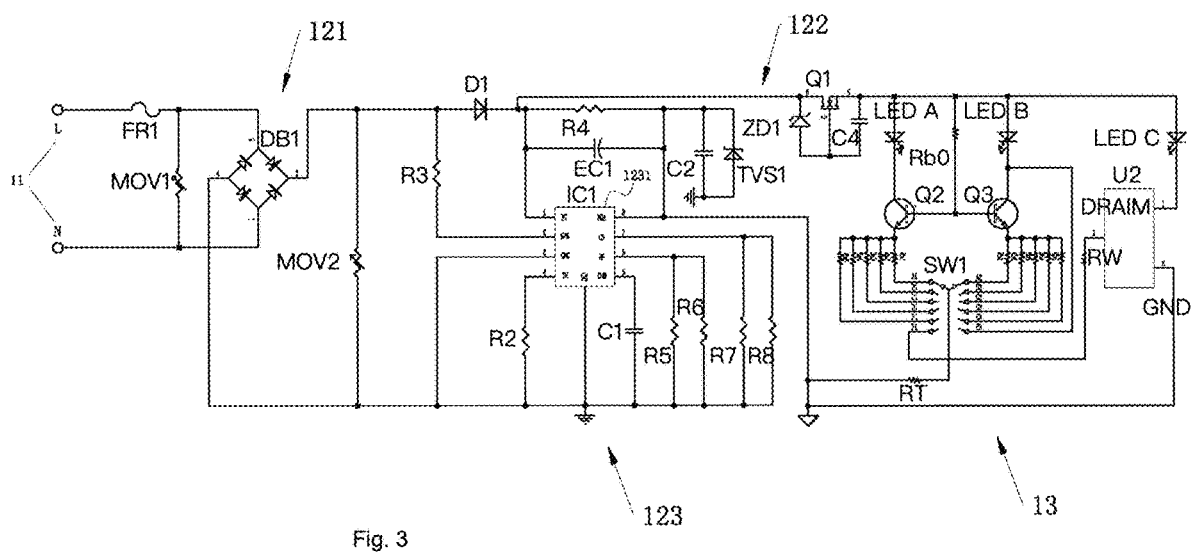
FIG. 3 illustrates a circuit example of a lighting apparatus.

FIG. 3 shows a circuit example. In FIG. 3, the rectifier 121 includes a bridge circuit. DB1. A variable resistor MOV1 and a variable resistor MOV2 are disposed for changing resistor values. There are resistors R3, R2, R4, R5, R6, R7, R8 and capacitors C1, C2, C4, transistors Q2, Q3, Q1, Zener diodes ZD1, diodes D1, LED A, LED B, LED C, control chips U1, U2, manual switch SW1 together form a filter 122, a control circuit 123 and light module 13.

Figure 4:
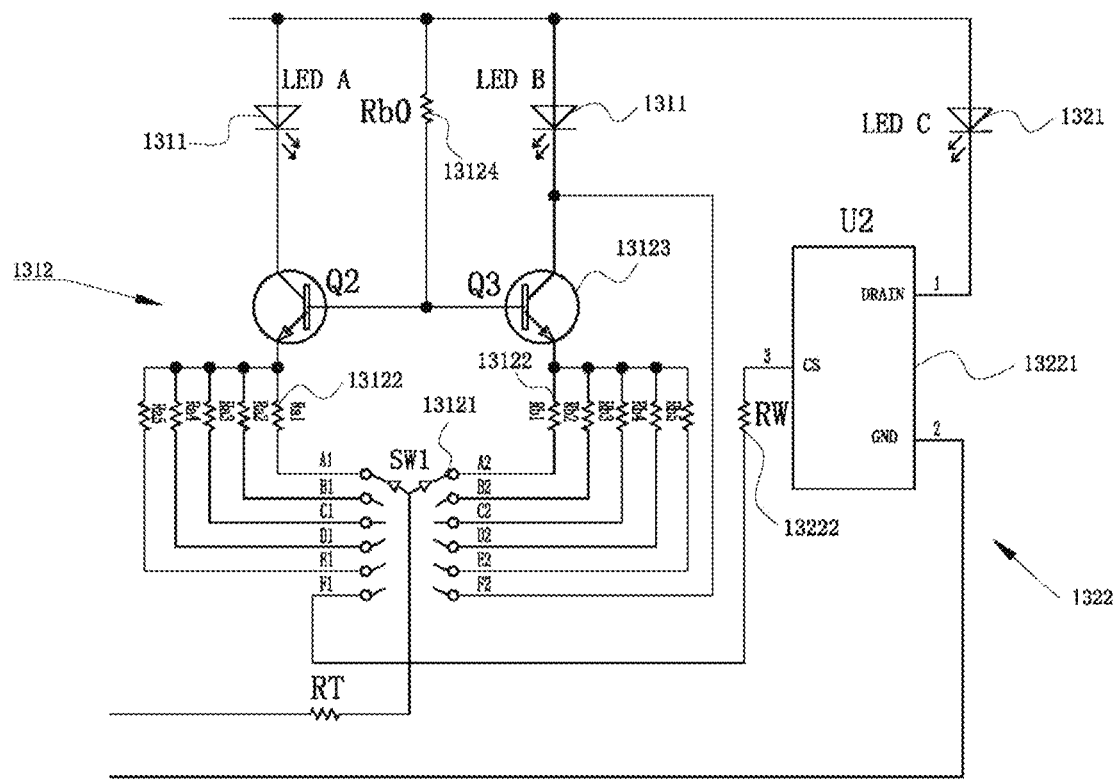
FIG. 4 illustrates a portion of circuit example.

FIG. 4 shows a CCT branch 131, a D2 W branch 132. The CCT branch 131 includes a first light source LED A 1311 and a second light source LED B 1311. The D2 W branch 132 includes a LED C 1321. There is a constant current controller 13221 a second current limit resistor 1322. The transistors Q2 and Q3 13123 form a CCT color temperature switch circuit 1312. By disposing adjustment resistors 13122, the switch SW1 13121 provides users to set a desired option corresponding to a desired color temperature.

Figure 5:
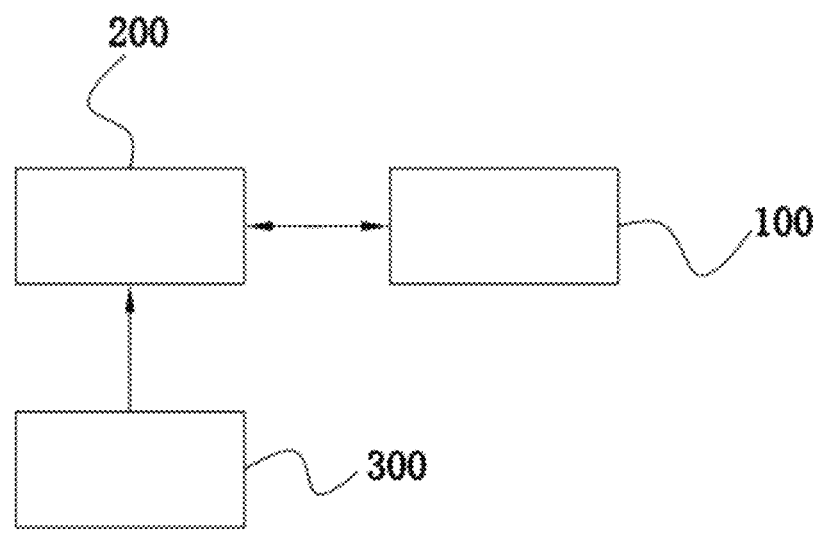
FIG. 5 illustrates a wireless control embodiment.

FIG. 5 shows an antenna 100 receiving a wireless command to a RF circuit 200. A switch 300 is also coupled to the RF circuit 200 to achieve flexible control.

Figure 6:
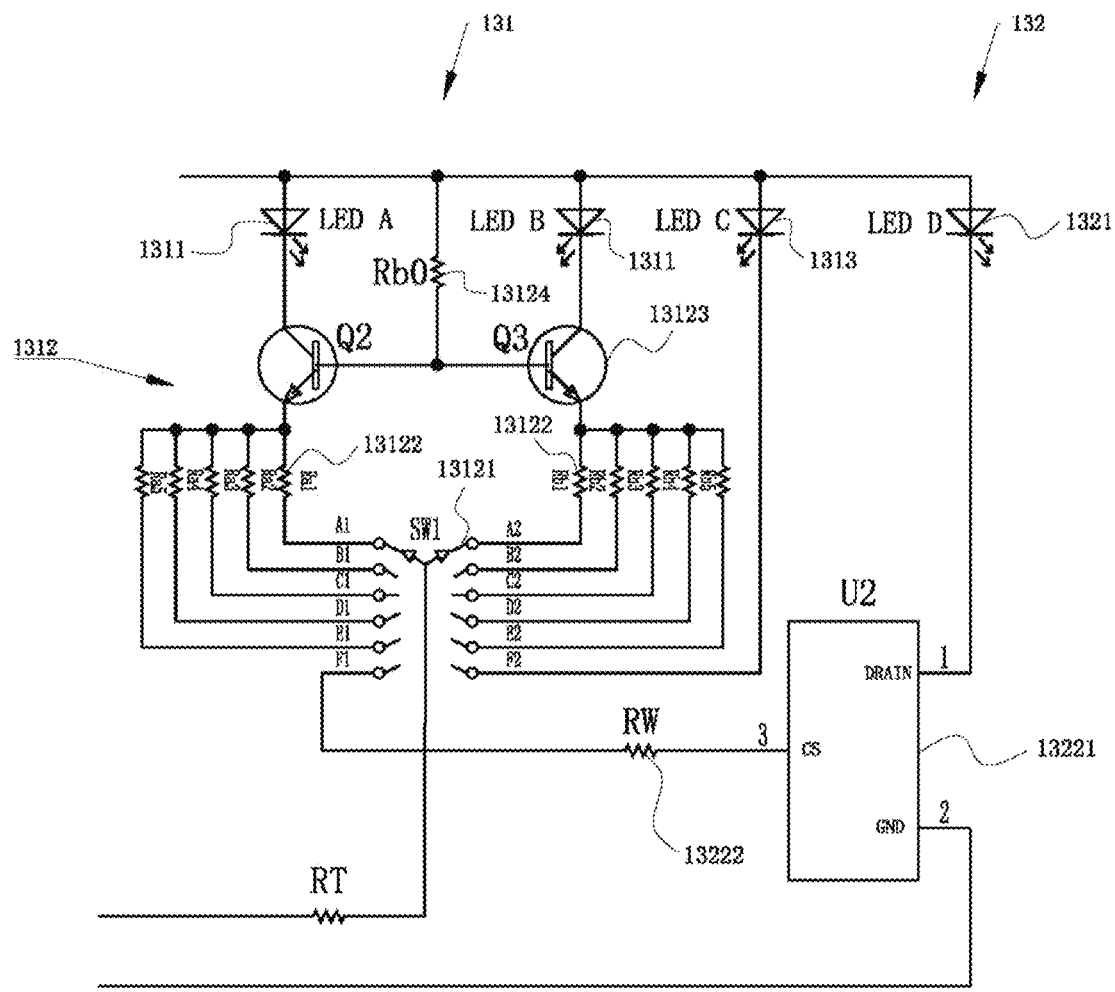
FIG. 6 illustrates another circuit example.

FIG. 6 shows a circuit similar to FIG. 4. Same reference numerals refer to the same components and thus are not described again.

Figure 7:
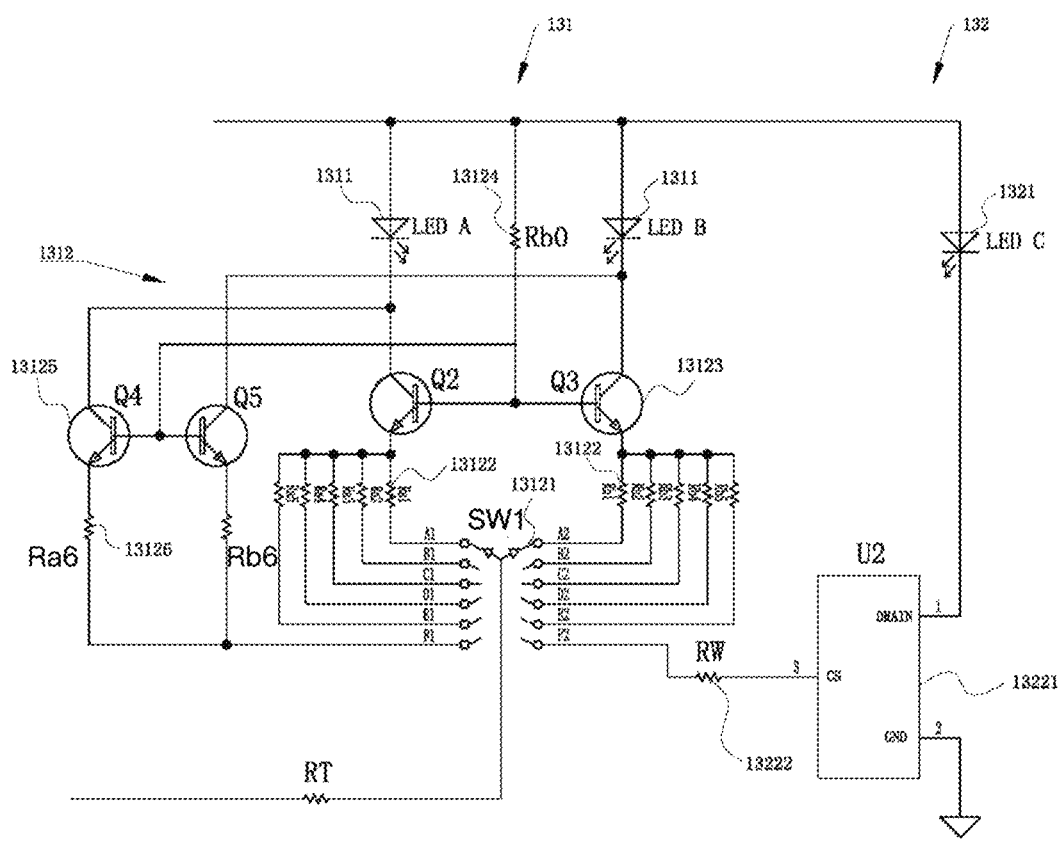
FIG. 7 illustrates another circuit example.
Figure 8:
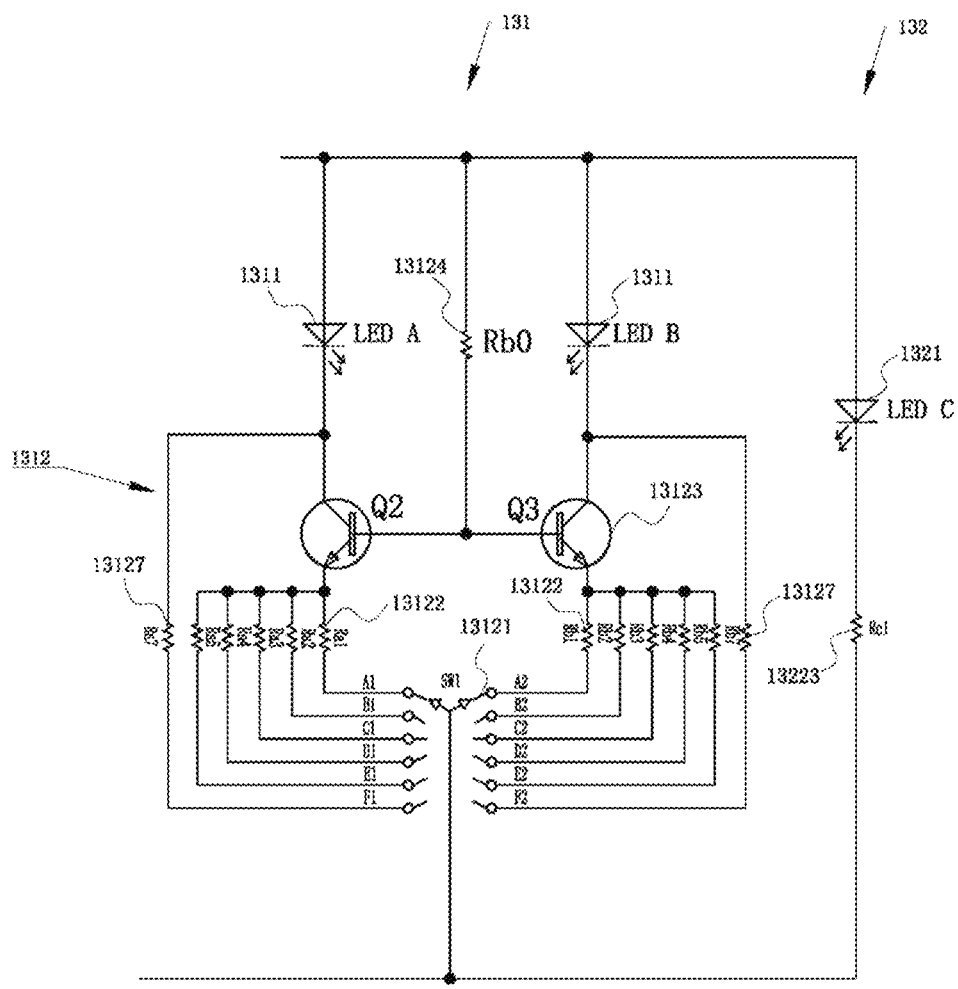
FIG. 8 illustrates another circuit example.

FIG. 7 and FIG. 8 show two additional alternative designs of FIG. 4 and FIG. 6.

Figure 9:
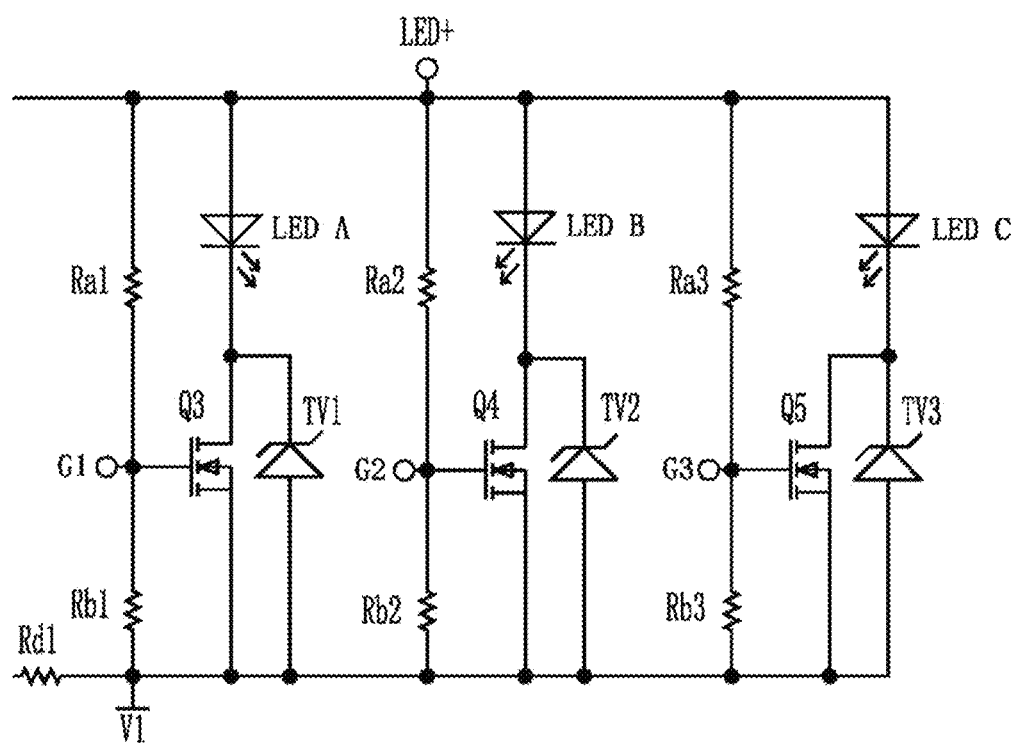
FIG. 9 illustrates a switch based control circuit.

FIG. 9 shows how multiple transistors Q3, Q4, Q5 are used for forming a switch circuit controlling driving currents supplied to the LED A, LED B and LED C light sources.

Figure 10:
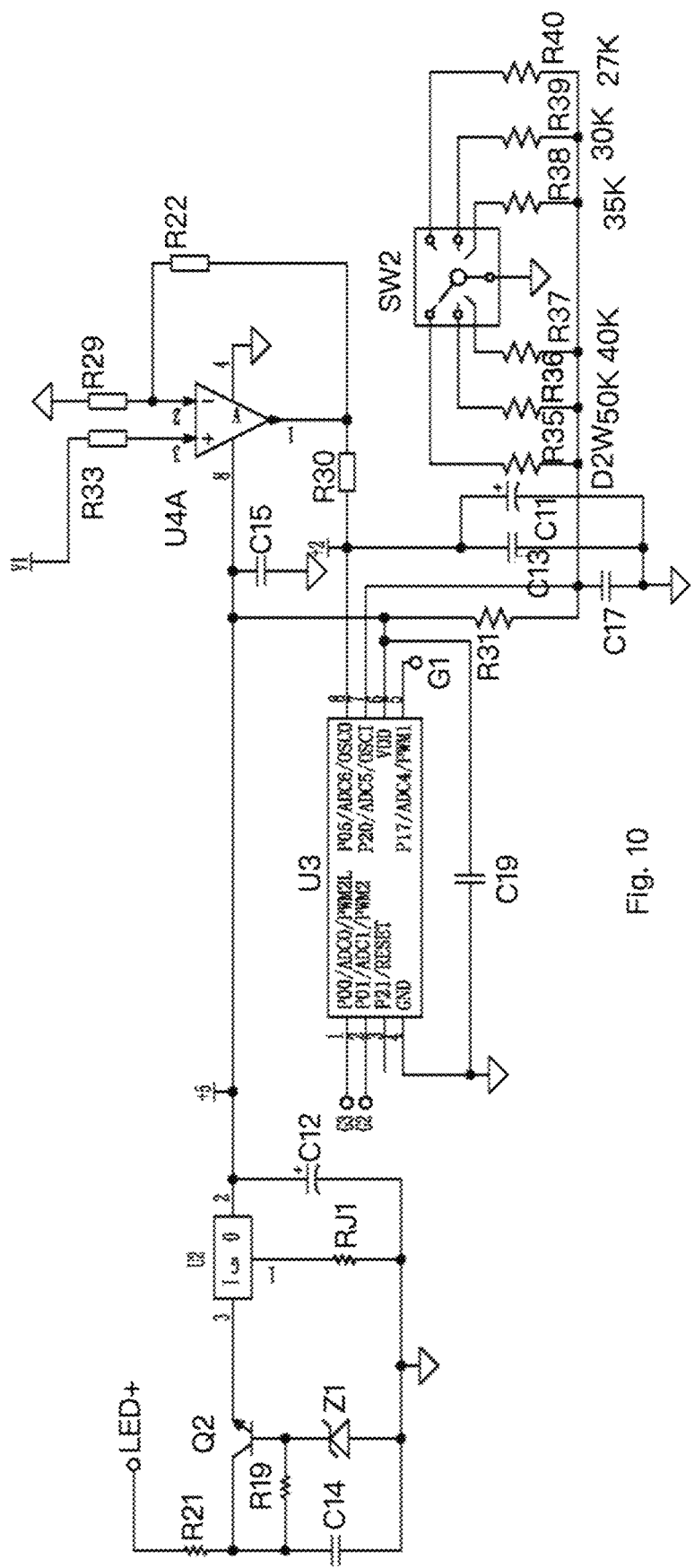
FIG. 10 illustrates a circuit structure of a lighting apparatus.

FIG. 10 shows a simplified circuit diagram with a manual switch SW2 which is operated by a user to change a coupled resistor so as to change a mixed light of the first light source and the second light source.

Figure 11:
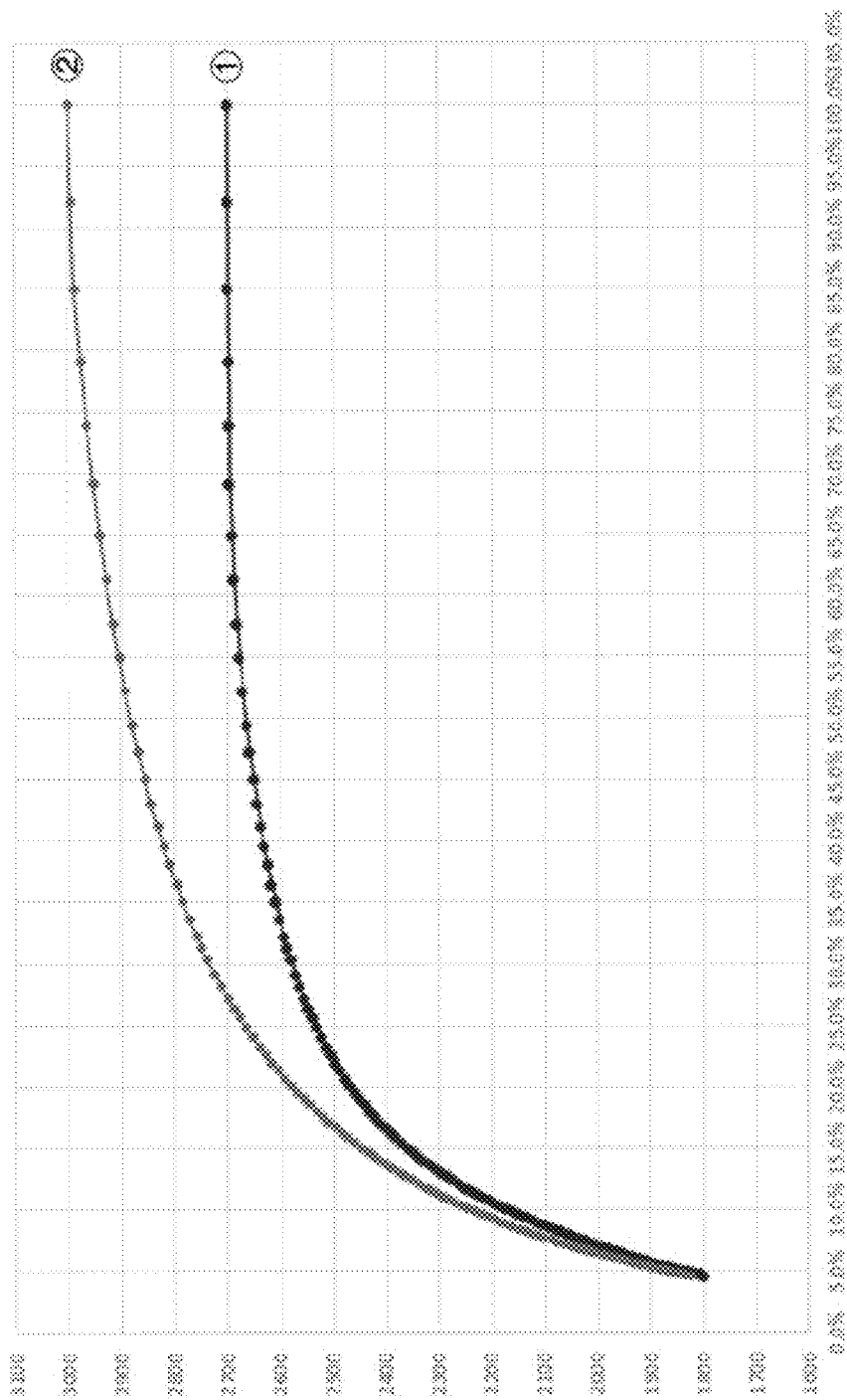
FIG. 11 illustrates a color temperature curve diagram.

FIG. 11 shows a first mixed light 2 and a third light 1 adjustment over light intensity variation.

FIG. 12 shows a black-body radiation. The main controller, as mentioned above, adjusts the driving currents by reference to a table to render mixed light closely approaching the black-body radiation characteristics.

FIG. 13 shows a downlight example. In FIG. 13, the downlight has a surface rim 21. The components mentioned above are installed in the light housing for emitting a light from a light passing cover 24. The downlight has fixing units 22 to attach to a platform.

Figure 14:
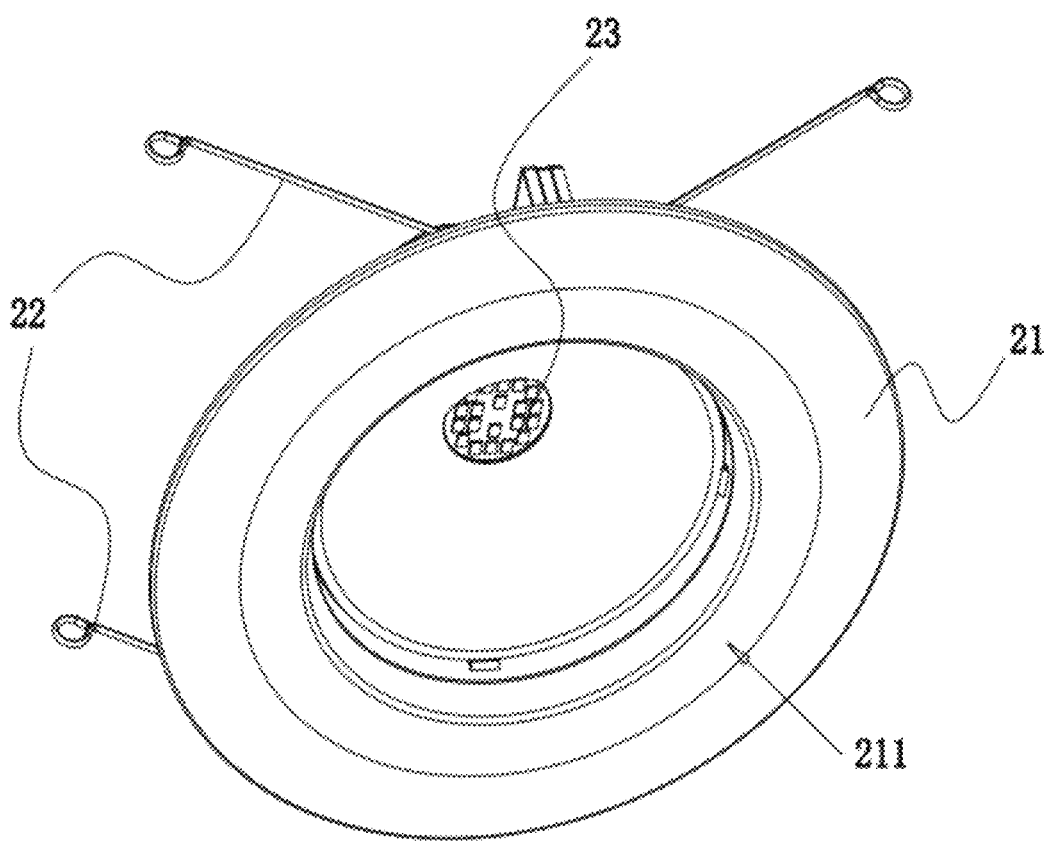
FIG. 14 illustrates another view of the example in FIG. 13.

FIG. 14 shows another view of the example in FIG. 13. The container 211 is used for storing the light source plate 23 that is used for disposing the components mentioned above.

Figure 15:
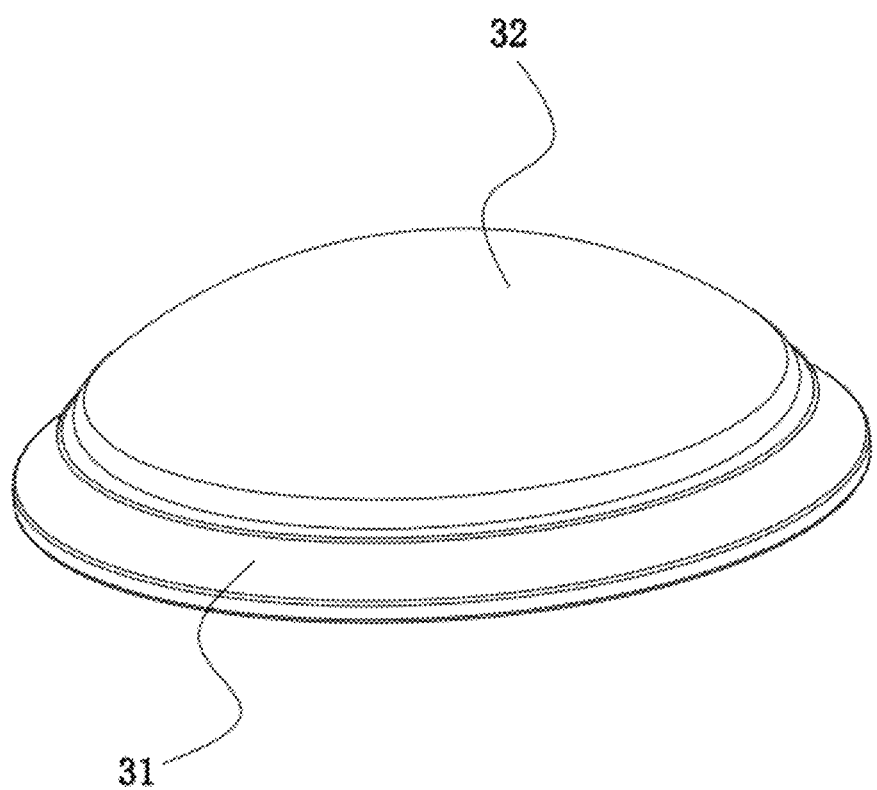
FIG. 15 illustrates a panel light embodiment.

FIG. 15 shows another lighting apparatus type. In FIG. 15, the lighting apparatus has a light cover 32 and a base housing 31. The components mentioned above are installed in the light housing 31.

FIG. 16 shows another view of the example in FIG. 15. In FIG. 16, the driver 34, the light source are placed on a light source plate which is further disposed in a container 311 of the light housing 31.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
a first light source for emitting a first light with a first color temperature;
a second light source for emitting a second light with a second color temperature;
a third light source for emitting a third light with a third color temperature;
a driver for generating a first driving current to the first light source, for generating a second driving current to the second light source, and for generating a third driving current to the third light source;
a first controller coupled to the driver for changing a ratio between the first driving current and the second driving current to obtain a first mixed light, wherein the first mixed light has a first mixed color temperature;
a second controller coupled to the driver for changing the third driving current so as to mix the first mixed light with the third light to produce a total mixed light;
a main controller coupled to the first controller and the second controller, wherein when a light intensity of the total mixed light decreases, a color temperature is decreased under a first working mode, wherein the main controller references a table for rendering the total mixed light to approach to a black-body radiation curve.

2. The lighting apparatus of claim 1, further comprising a dimmer switch for sending a dimmer operation to the main controller to lower the light intensity of the total mixed light under the first working mode.

3. The lighting apparatus of claim 1, wherein a voltage drop parameter of the third light source is lower than both the first light source and the second light source.

4. The lighting apparatus of claim 3, wherein when a driving voltage of the driver is increased, a light intensity of the third light source is decreased.

5. The lighting apparatus of claim 4, wherein the driving voltage is larger than a threshold, the third lights source is turned off.

6. The lighting apparatus of claim 1, wherein the first light source, the second light source and the third light source are LED modules.

7. The lighting apparatus of claim 1, wherein the third color temperature of the third light source is lower than both the first light source and the second light source.

8. The lighting apparatus of claim 1, further comprising a manual switch coupled to the first controller for adjusting the ratio between the first driving current and the second driving current.

9. The lighting apparatus of claim 8, wherein the manual switch has more than three options to be selected manually, wherein each option is associated to a different value of the first mixed color temperature.

10. The lighting apparatus of claim 1, wherein the first light source and the second light source are connected as a light module, wherein the light module is connected with the third light source in parallel.

11. The lighting apparatus of claim 1, further comprising a mode switch to select from the first working mode and a second working mode, wherein in the second working mode, the third light source is disabled.

12. The lighting apparatus of claim 1, wherein the driver comprises a rectifier for converting an external AC power to a DC power, wherein the driver comprises a filter for filtering the DC power to the first driving current, the second driving current and the third driving current.

13. The lighting apparatus of claim 1, further comprising a downlight housing for holding the first light source, the second light source, the third light source and the driver.

14. The lighting apparatus of claim 1, further comprising a light bulb housing for holding the first light source, the second light source, the third light source and the driver.

15. The lighting apparatus of claim 1, further comprising a single light source plate for disposing the first light source, the second light source, the third light source and the driver.

16. The lighting apparatus of claim 1, wherein the total mixed light has a color temperature falling within 30% difference of the black-body radiation curve.

17. The lighting apparatus of claim 1, wherein the main controller issues control signals to a constant current source to generate the first driving current, the second driving current and the third driving current.

18. The lighting apparatus of claim 1, wherein the main controller receives a wireless command to adjust the first driving current, the second driving current and the third driving current.

19. The lighting apparatus of claim 1, wherein in a third working mode, the first light source and the second light source are disabled and only the third light source emits the third light.

* * * * *